(12) United States Patent
Figueroa et al.

(10) Patent No.: US 10,806,298 B2
(45) Date of Patent: Oct. 20, 2020

(54) SYSTEM AND METHOD FOR GENERATING AND APPLYING HEAT

(71) Applicants: Oscar Enrique Figueroa, La Libertad (SV); Silvia Elizabeth Figueroa, Tucson, AZ (US)

(72) Inventors: Oscar Enrique Figueroa, La Libertad (SV); Silvia Elizabeth Figueroa, Tucson, AZ (US)

( * ) Notice: Subject to any disclaimer, the term of this patent is extended or adjusted under 35 U.S.C. 154(b) by 164 days.

(21) Appl. No.: 16/086,313

(22) PCT Filed: Mar. 20, 2017

(86) PCT No.: PCT/US2017/023228
§ 371 (c)(1),
(2) Date: Sep. 18, 2018

(87) PCT Pub. No.: WO2017/165303
PCT Pub. Date: Sep. 28, 2017

(65) Prior Publication Data
US 2019/0099041 A1 Apr. 4, 2019

Related U.S. Application Data

(60) Provisional application No. 62/311,818, filed on Mar. 22, 2016.

(51) Int. Cl.
*A47J 37/07* (2006.01)
*F24B 1/20* (2006.01)

(52) U.S. Cl.
CPC ......... *A47J 37/0704* (2013.01); *A47J 37/079* (2013.01); *A47J 37/0763* (2013.01); *F24B 1/202* (2013.01)

(58) Field of Classification Search
CPC .. A47J 37/0704; A47J 37/0763; A47J 37/079; F24B 1/202; F24B 1/205; F24B 1/207
See application file for complete search history.

(56) References Cited

U.S. PATENT DOCUMENTS

| | | | | |
|---|---|---|---|---|
| 2,939,773 A | * | 6/1960 | Rymer | A47J 37/079 126/65 |
| 4,539,973 A | * | 9/1985 | Hait | A47J 37/0763 126/43 |
| 6,314,955 B1 | * | 11/2001 | Boetcker | A47J 36/2477 126/25 R |

(Continued)

*Primary Examiner* — David J Laux

(57) ABSTRACT

A heating or cooking method and apparatus is provided. The heating or cooking method or apparatus includes an insulated combustion chamber having an opening at one end and an extension ring extending from the open end. The extension ring may have at least one tab extending from the extension ring, configured to provide an air exhaust space when a piece of cookware is used with the heating apparatus. A fuel receptacle configured to fit inside the combustion chamber has a raised center section with at least one heat channel and a peripheral section with at least one hooded slot. The fuel receptacle may also have a lateral wall separated from the inner enclosure wall of the combustion chamber by a space when the fuel receptacle is situated within the combustion chamber. A grill having essentially the same perimeter shape as the fuel receptacle and a handle is also provided.

14 Claims, 13 Drawing Sheets

(56) References Cited

U.S. PATENT DOCUMENTS

| | | | | |
|---|---|---|---|---|
| 8,479,720 | B1* | 7/2013 | Figueroa | A47J 37/0704 110/108 |
| 9,131,801 | B2* | 9/2015 | Chung | A47J 37/041 |
| 9,861,231 | B2* | 1/2018 | Kim | A47J 37/06 |
| 2002/0069866 | A1* | 6/2002 | DeMars | A47J 37/0704 126/38 |
| 2004/0000303 | A1* | 1/2004 | Regen | A47J 37/0731 126/25 R |
| 2005/0121020 | A1* | 6/2005 | McLemore | A47J 37/0704 126/25 R |
| 2011/0073098 | A1* | 3/2011 | Chang | F24B 15/005 126/25 B |
| 2014/0326231 | A1* | 11/2014 | Despain | F24C 1/16 126/59 |

* cited by examiner

SYSTEM AND METHOD FOR GENERATING AND APPLYING HEAT

This application claims the priority benefit of International Application No. PCT/US17/23228, filed on Mar. 20, 2017, which claims priority benefit of U.S. Provisional Application No. 62/311,818, filed Mar. 22, 2016, each of which is incorporated herein by reference.

The present invention relates to the field of thermodynamics, particularly in the generation and transfer of heat, and has its specific application in the burning of fuel for cooking for residential use.

Every day, hundreds of millions of people step outside into an environment that has become unsafe for human survival. Air pollution kills more than 3 million people around the world each year. According to the internet site entitled: "America: Pollution Index 2016", the cities of Los Angeles, Calif.; Houston, Tex.; Atlanta, Ga.; Las Vegas, Nev.; Toronto, Canada, are some of the most contaminated cities in the north and south American continents. Although it is not the primary source, outdoor cooking emits particulates, $CO_2$ and other poisonous and damaging compounds into the atmosphere in significant quantities.

According to the Hearth, Patio and Barbeque Association, (HPBA), eighty percent of US households own a grill and 97% of those were actually used in the last year. Frequency of use varies from holiday or occasional use, to daily outdoor cooking. According to an earlier study by the HPBA, more than 200 million people may barbecue on a single holiday in the US alone, but this number would be even higher if this information were to include households who enjoy slow cooking and smoking, tail gating, and camping. Significant segments of the US population, such as Indian, Hispanic and Native American frequently cook outdoors traditionally, using a tandoori, an open fire, a grill, or some other type of massively inefficient device. The increase in the number of people who cook outdoors and its impact on big cities' air pollution has called the attention of the Environmental Protection Agency EPA which is very concerned about the contaminating nature of manufactured charcoals, wood fires, and lighting fluids for their polluting VOC emissions. Though still legal in other states, California has gone as far as to forbid the sale of lighting fluid.

Inefficiency and air pollution are only the beginning. According to the National Fire Protection Association, fire hazard is also a great concern with outdoor cooking devices. Even though gas and propane grills generate the most fires amongst outdoor cooking devices, charcoal grills can be problematic also. The National Fire Protection Association says "The leading cause of these structure fires was something that could burn being too close to the grill", meaning radiant heat or actual flames igniting something left close to the grill.

Many households in developing and impoverished countries around the world depend heavily on firewood, coal, or other carbon based fuels for cooking. Cooking, an everyday chore, not only transfers heat poorly hut, has consequences in human health and in the environment due to the gases generated by the inefficiency of the many carbon based combustion methods.

Traditional combustion is often inefficient, incomplete and generates gases which can cause various health problems. Grills using wood or charcoal as a heat source do little to conserve the heat energy generated by the burning fuel and these inefficient grills require more fuel and/or constant replenishing of fuel to effectively cook a meal.

In recent years, many private, social, governmental and other entities have made efforts to design and disseminate new methods and devices for more efficient combustion of fuel in order to solve the problem, but in applicant's experience these efforts do not appear to have had provided a real, effective solution.

So as to reduce the complexity and length of the Detailed Specification, and to fully establish the state of the art in certain areas of technology, Applicant(s) herein expressly incorporate(s) by reference all of the following materials identified in each numbered paragraph below. The incorporated materials are not necessarily "prior art" and Applicant(s) expressly reserve(s) the right to swear behind any of the incorporated materials.

U.S. Pat. No. 7,670,392 to Correa et al.
U.S. Pat. No. 2,473,569 to Cast
U.S. Pub. 2008/0168977 to Daud
U.S. Pat. No. 3,955,487 to Chetta
U.S. Pat. No. 5,918,536 to Cheng
U.S. Pat. No. 8,479,720 to Figueroa Applicant(s) believe(s) that the material incorporated above is "non-essential" in accordance with 37 CFR 1.57, because it is referred to for purposes of indicating the background of the invention or illustrating the state of the art. However, if the Examiner believes that any of the above-incorporated material constitutes "essential material" within the meaning of 37 CFR 1.57(c)(1)-(3), applicant(s) will amend the specification to expressly recite the essential material that is incorporated by reference as allowed by the applicable rules.

The present invention provides among other things an efficient burning heating apparatus using conventional charcoal, wood, or other readily available fuel. It is an object of the invention to provide a cooking stove that more efficiently using carbon combustion fuel.

It is another object of the invention to provide a stove that burns longer, allowing the cooking of materials that require more time to cook.

It is another object of the invention to provide a safer cooking device.

It is another object of the invention to provide a cooking device that is easier to clean.

It is another object of the invention to provide a cooking device that is easier to light than the currently available alternatives, eliminating the need to use contaminating lighter fluids or lighting devices that emit large amounts of smoke.

It is another object of the invention to provide a safe, simple cooking device that securely holds a variety of cookware.

It is another object of the invention to provide a cooking device that efficiently contains heat to the cookware, and limits the heat lost to the environment.

It is another object of the invention to provide a cooking device that will not burn the user or a table or other surface on which the cooking device is placed It is another object of the invention to provide a safer combustion grill.

It is another object of the invention to provide a grill that uses a comparatively small amount of fuel.

It is another object of the invention to provide a durable cooking device capable of efficiently performing a wide variety of cooking tasks such as grilling, boiling, frying, roasting, smoking.

It is another object of the invention to provide a more portable cooking device that is easy to store.

It is another object of the invention to provide a cooking device that allows the user to shake the ashes and reload the fuel for continuous cooking, or conversely to safely put out the partially burned charcoal at any stage of the cooking process, to reuse the charcoal at a later time, eliminating unnecessary pollution and waste of fuel.

It is another object of the invention to reduce the carbon footprint of back yard and outdoor cooking everywhere, improving the quality of community air, the health of the user, and greatly reduce the use of precious renewable resources.

The above and other objects may be achieved using devices involving an insulated combustion chamber having an inner enclosure wall and an outer enclosure wall following the contour of the inner enclosure wall. The outer enclosure wall may be separated from the inner enclosure wall by a space, and the space may be filled with an efficient insulating material. The shape of the insulating walls defines an opening at an open end of the combustion chamber. At least one hole is situated at the opposite end of the combustion chamber, allowing air to flow from the holes through the combustion chamber, and out the open end of the combustion chamber.

A fuel receptacle having a perimeter configured to fit inside the shape of the open end of the combustion chamber has a raised center section with at least one heat channel and and a peripheral section with at least one hooded slot. The fuel receptacle may have a handle configured to be situated in connection with the combustion chamber. The fuel receptacle may also have a lateral wall separated from the inner enclosure wall of the combustion chamber by a space when the fuel receptacle is situated within the combustion chamber.

A grill having essentially the same perimeter shape as the fuel receptacle and a handle is also provided. The grill has at least one suspension arm protruding from the plane of the grill to securely situate the grill in the combustion chamber and to help situate cookware relative to the grill. The grill may also have a safety tab to retain and inhibit slippage of cookware used with the grill.

In a particular embodiment, the combustion chamber includes an extension ring extending from the open end of the combustion chamber. The extension ring may have slots to accommodate the handles of the fuel receptacle and the grill. The extension ring may also have at least one tab extending from the extension ring, configured to provide an air exhaust space when a piece of cookware is used with the heating apparatus.

The fuel of the heating apparatus can be conveniently lit by placing a piece of burning fuel at the bottom of the combustion chamber and placing the fuel receptacle, loaded with fuel, above the burning fuel. For example, a cotton ball or a paper napkin soaked in 91 percent alcohol or vegetable oil may be placed in the bottom of the combustion chamber and lit. The combustion chamber may then be situated above the lit fuel. Once the alcohol is fully burned, the carbon based fuel (charcoal) should have had started to burn. The heat from the ignited fuel will create a chimney effect in the uncovered combustion chamber, and the fuel is ready to cook on within a short period of time thereafter The heating apparatus may be conveniently cleaned by simply removing the fuel receptacle from the combustion chamber, cleaning the fuel receptacle, and replacing the fuel receptacle within the combustion chamber. The hooded slots of the fuel receptacle prevent ash and other combustion detritus from dirtying the combustion chamber itself.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

A more complete understanding of the present invention may be derived by referring to the detailed description when considered in connection with the following illustrative figures. In the figures, like reference numbers refer to like elements or acts throughout the figures.

Elements and acts in the figures are illustrated for simplicity and have not necessarily been rendered according to any particular sequence or embodiment.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention. It should be noted that there are many different and alternative configurations, devices and technologies to which the disclosed inventions may be applied. The full scope of the inventions is not limited to the examples that are described below.

Figure 1A:
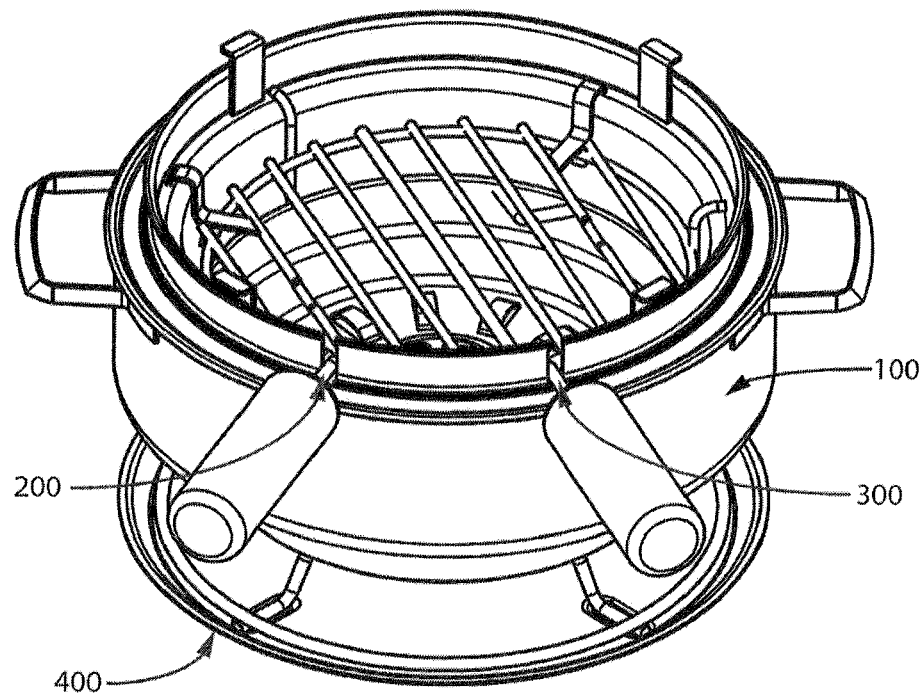
FIG. 1A depicts a perspective view of one embodiment of the present invention.
Figure 1B:
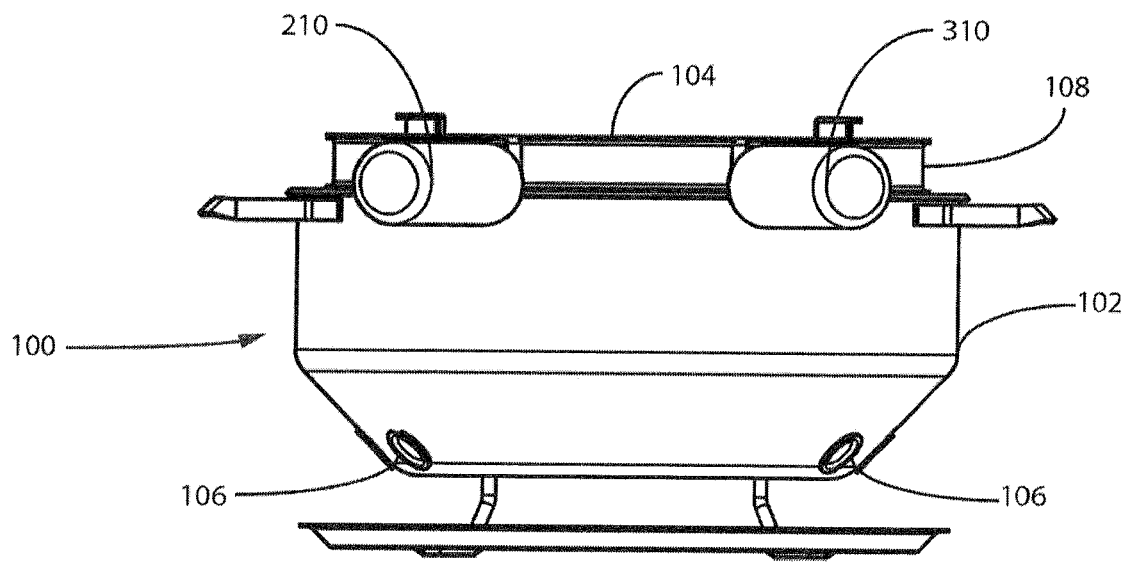
FIG. 1B depicts a side view of the embodiment of FIG. 1A
Figure 2:
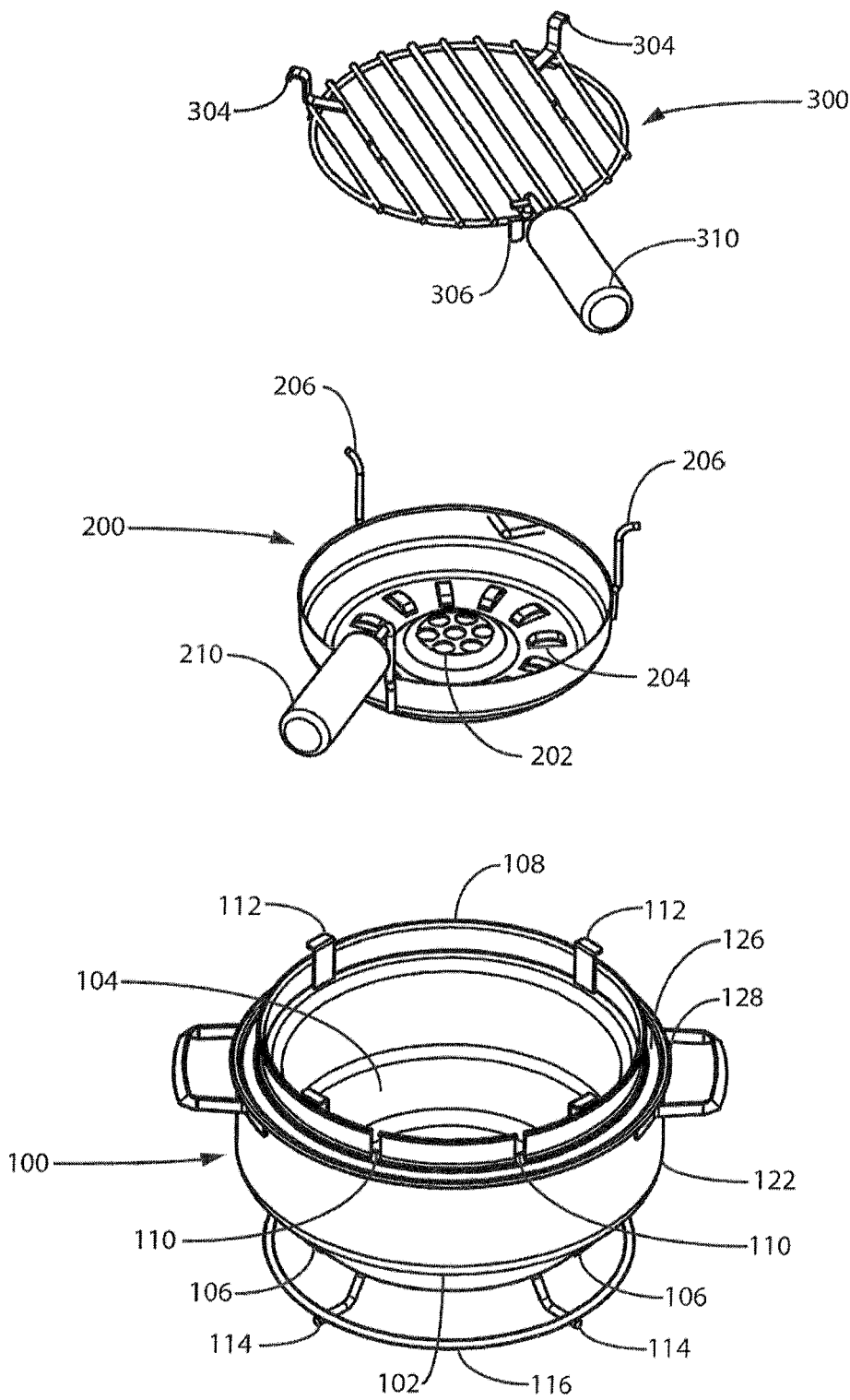
FIG. 2 is an exploded perspective view of the embodiment depicted in FIG. 1A.

In one application of the invention, a cooker includes a combustion chamber 100. The combustion chamber 100 is defined by an insulated wall 102 with an opening 104 through which heat is channeled. Insulated Combustion Chamber 100 (FIGS. 3A, 3B and 3C), consists of two substantially concentric enclosure walls 120 and 122. The inner enclosure wall 120 is smaller and follows the contours of the outer enclosure wall 122 (FIG. 1B), with the space between the inner and outer enclosures (FIG. 3C) filled with a high quality, fireproof insulating material 124.

The insulation 124 between the enclosure walls (120 and 122) of the combustion chamber 100 is designed to reduce and minimize heat loss through the walls 102 of the combustion chamber 100, thereby accomplishing the following: more efficient combustion of the carbon based fuel due to increased temperatures in the combustion chamber 100 itself; retention of more heat (compared to uninsulated chambers) within the combustion chamber 100, which additional heat is then available for transfer to cooking surfaces and/or the grilling area above; the safety factor of minimizing the heat transfer to the outer enclosure wall 122, thereby minimizing the risk of burns to users or heat transfer to adjacent objects; efficient operations at lower ambient air temperatures than devices with uninsulated combustion chambers.

Figure 3A:
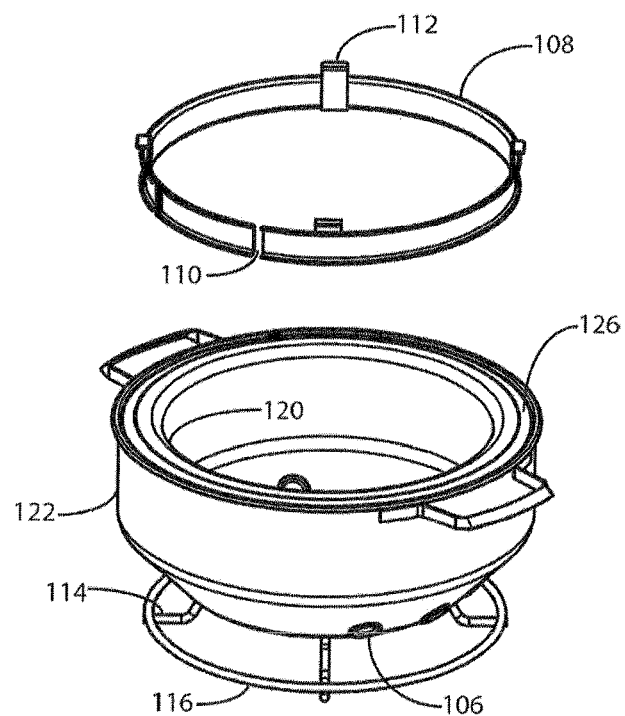
FIG. 3A is a partially exploded view of the combustion chamber of the present invention, showing especially the extension ring of the embodiment of FIG. 1A.
Figure 3B:
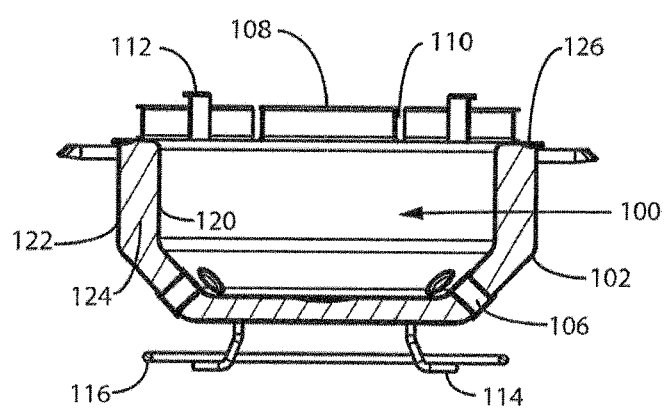
FIG. 3B is a side cutaway view of the combustion chamber of the embodiment of FIG. 1A.
Figure 3C:
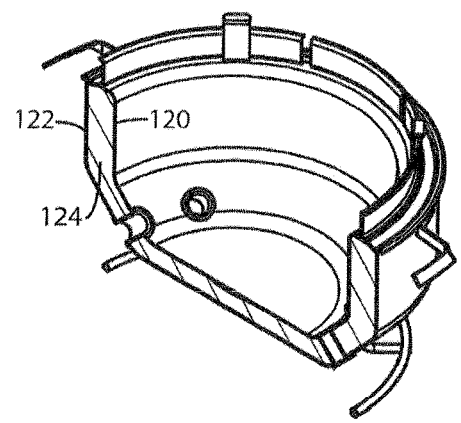
FIG. 3C is a perspective cutaway view of the combustion chamber of the embodiment of FIG. 1A.

The upper end of the vertical inner enclosure curves outward 90 degrees to form a wide, flat rim 126, (See, especially FIG. 3A), extending over the insulating material and is then clamped and tightly sealed over the exterior enclosure's vertical terminus 128 of the combustion chamber 100 FIGS. 3A, 3B, 3C. The flat rim 126 has the following functions: to provide a place to fix (weld) the 2 sections of the multifunction extension ring 108; to provide a place where the arms (206 and 306, respectively) of the fuel receptacle 200 and reversible grill 300 can hang, and upon which the handles rest; to support accessories such as the smoking lid 7, FIG. 8D, and baking lid 8, FIG. 8C. which are retained by the knurled outer edge of the flat rim 1.*f*.

Figure 3D:
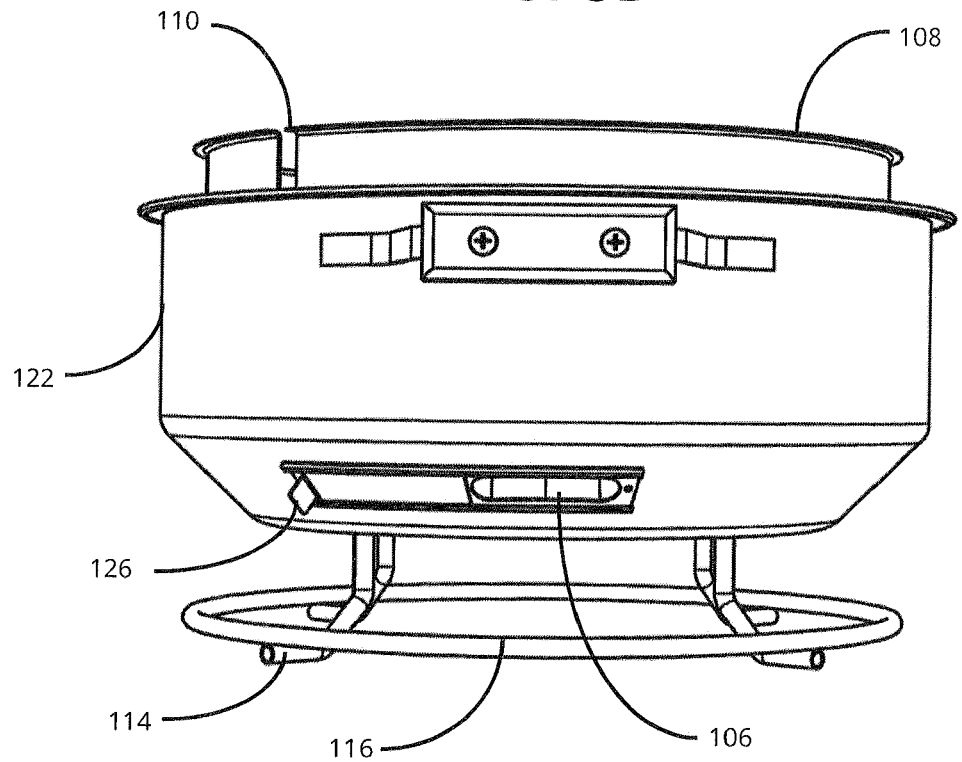
FIG. 3D is a lateral view of an alternate embodiment of the combustion chamber.
Figure 3E:
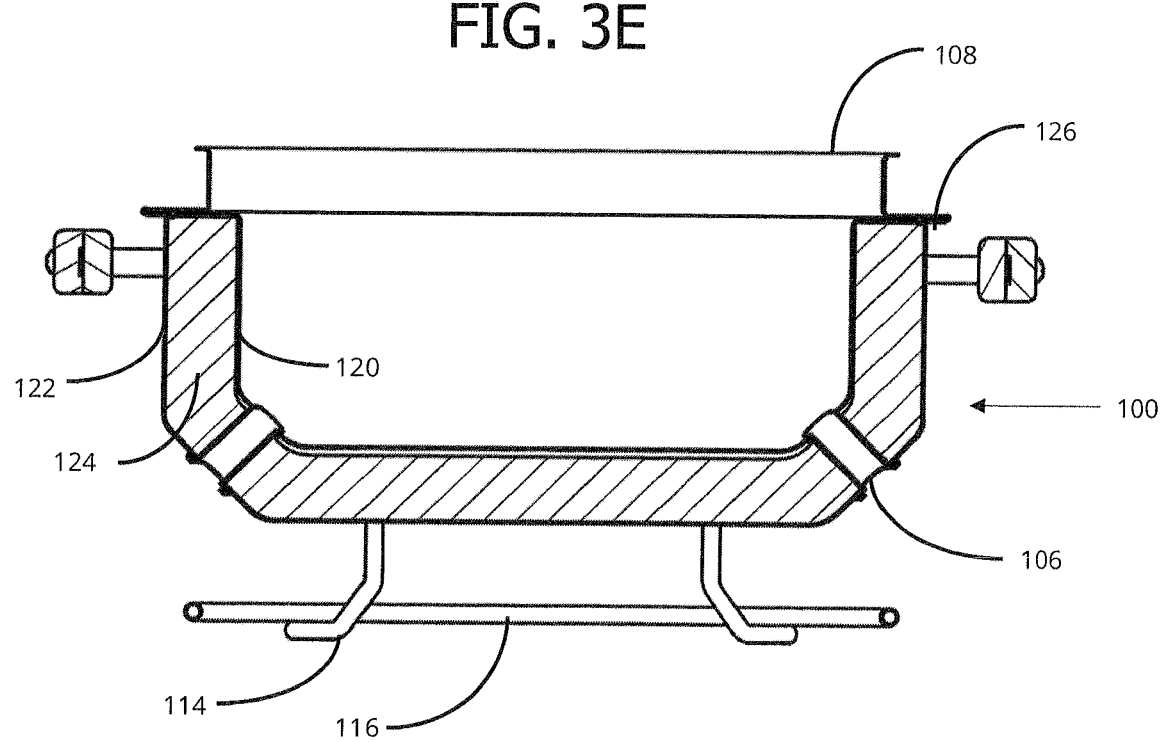
FIG. 3E is a front cutaway view of the combustion chamber of FIG. 3D.

The insulated wall 102 has holes 106 at a position distal to the opening 104. These dual purpose air intake/liquid drainage holes 16 pierce both walls 120, 122 of the combustion chamber 100 and insulating material 124, are made of the same heat resistant material as the enclosure walls 120, 122, and are press-sealed against the interior wall 120 and exterior enclosure wall 122. The holes 106 are arranged substantially radially, and positioned and inclined to allow air to enter in a controlled and specific manner into and through the entire combustion chamber 100, as shown by the air flow arrows in FIG. 7B. The holes 106 are placed in locations that also may allow drainage of any liquids that may fall to the interior bottom of the device (during the cooking process, i.e. boil over or spill), and the placement of the holes 106 allows for a fully sealed and insulated horizontal bottom to the combustion chamber 100, thereby minimizing heat transfer to a table or other surface upon which the device rests. The placement of the holes 106 in the combustion chamber 100, in combination with the configuration of air flow openings 202 in the fuel receptacle 200 (described below) greatly reduce the possibility of fuel embers falling through or out of the combustion chamber. As best shown in FIG. 3D, in a particular embodiment, the holes 106 may be opened or closed with a valve 126 for better temperature and airflow control. The valve 126 may be a slidable valve 126 or any other valve known in the art to selectively open or close a hole 106.

An extension ring 108 extends from the insulated wall 102 of the combustion chamber 100 at the opening 104. The extension ring 108 may include slots 110 to accommodate a removable fuel receptacle 200 and a grill 300. Tabs 112 further extend from the extension ring 108 to optimize air flow and retain cookware. This extension ring 108 is welded onto the horizontal rim 126 at a location between the inner and outer edges of the rim of the device FIG. 3A.

The extension ring 108 further extends the height of the combustion chamber 100 creating a chimney effect, and allows for and supports the use of a larger variety, and significantly larger sizes of cookware than would otherwise be usable on the device; increases heat transfer to the contents of cooking vessels, by channeling air up along the vertical sides of the cookware; creates a chimney effect, optimizing airflow for improved ongoing combustion in the combustion chamber 100 during the cooking process, especially when a pot or pan is of a larger diameter than the upper end of the combustion chamber 100; and substantially lessens the cooling effect of drafts of ambient air from the side that would otherwise reduce heat transfer to cooking surfaces.

The two slots 110 allow the handles of both the fuel receptacle 200 and the grill 300, to rest securely and with stability on the rim 126 of the combustion chamber 100 while the fuel receptacle 200 and the grill 300 perform their functions in the combustion chamber 100. The extension ring 108. also shields the handles 210, 310 of fuel receptacle 200 and grill 300 from the heat exiting the combustion chamber 100.

The tabs 112 extend above the height of the extension ring 108. In a particular embodiment, the tabs 112 are designed to provide an air exhaust space 140 for optimal draw and exhaust ventilation thus maximizes combustion efficiency, and to prevent the combustion chamber 1 from being operated with a substantially closed exhaust space, which might otherwise occur when larger flat cookware (other than the specially designed accessory pot 5) is used. The tabs 112 are also especially useful to suspend and stabilize round bottom cookware, such as woks, some frying pans or other such cookware closer to the heat source, making the heat transfer more efficient.

Handles 132 (see FIG. 3A) are arranged laterally opposite near the top of the combustion chamber 100. The handles 132 are attached to the outside enclosure wall 122 of the combustion chamber and are designed to remain relatively cool and allow the user to safely move the device when needed.

The combustion chamber 100 may be supported on legs 114. The legs 114 may be coupled to the insulated wall 102 of the combustion chamber 100 by welding or any other appropriate method known in the art. The legs 114 may be further supported by a stabilizing ring 116. The legs 114 and stabilizing ring 116 (FIG. 3B) provide a stable and safe support for the device, making it difficult to tip over. The legs 114 hold the device so the bottom of the device doesn't make contact with the surface it rests on and allows for an air space between table and combustion chamber 100.

Figure 4A:
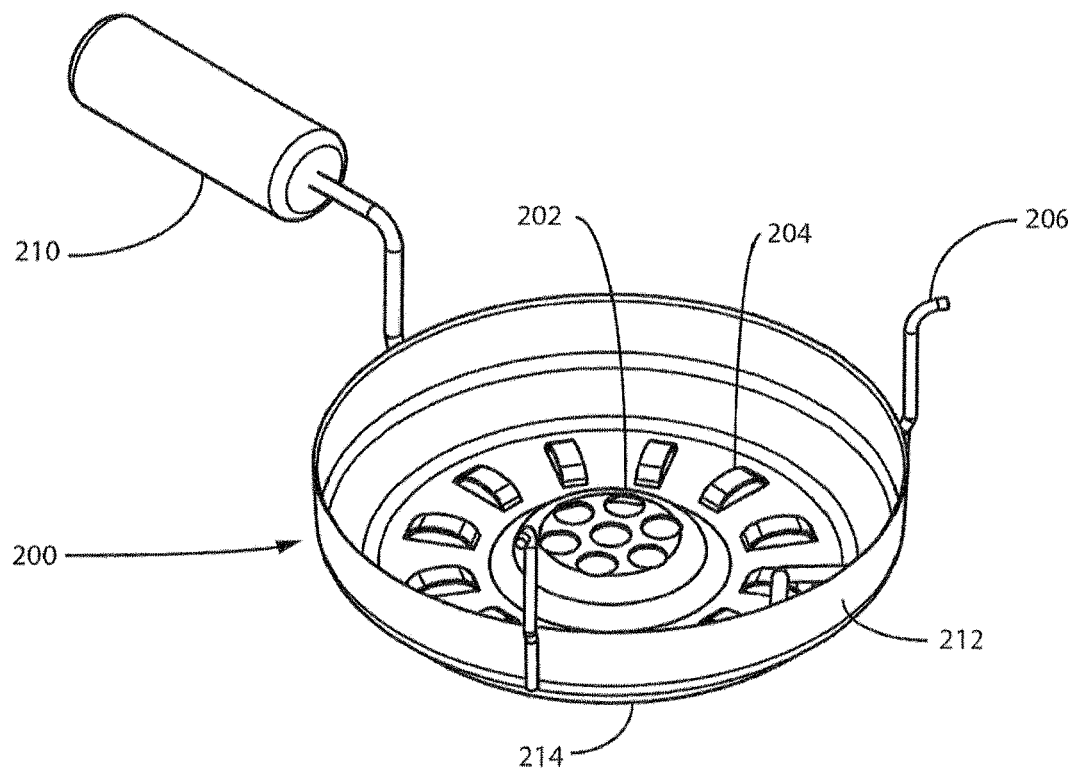
FIG. 4A is a perspective view of the fuel receptacle of the embodiment of FIG. 1A.
Figure 4B:
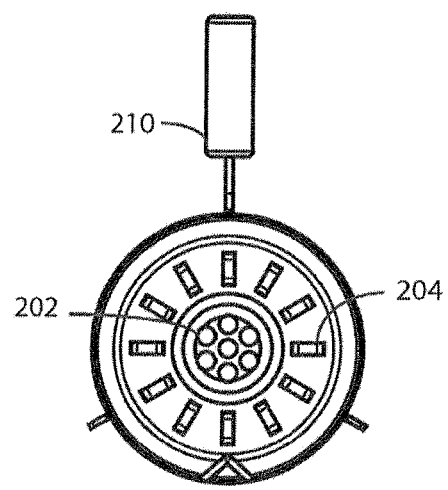
FIG. 4B is an overhead view of the fuel receptacle of FIG. 4A.

The fuel receptacle 200 retains the fuel 220 and manages air flow to the burning fuel 220 in the most efficient manner during all phases of combustion. In a particular embodiment, the fuel receptacle has a substantially conical cylindrical shape, mimics the contour of the inner wall 120 of the combustion chamber 100, has a solid lateral wall 212 and a circular bottom 214 which has a raised center section 216 with several heat channels 202 (FIG. 4A), sized and situated to channel ignition heat and flames (when applied from below) into direct contact with the fuel 220 during the ignition process. The heat channels 202 also provide a direct flow of air to the center portion of the burning fuel 220. In an alternative embodiment best shown in FIGS. 4D and E, the heat channels 202 may be shielded by a shield 218 to prevent ashes from passing through the heat channels 202.

Arranged concentrically around the plurality of heat channels 202 is a plurality of hooded raised slots 204, which prevent fuel 220 from lying flat. The hooded configuration of these slots 204 also prevents ashes from falling through the fuel receptacle into the bottom of the combustion chamber. These raised slots 204 have many crucial functions: they are designed to hold the charcoal based fuel 220 (especially if they are in briquette form) inside the fuel receptacle at different angles, keeping air flow unobstructed and delivering an optimal airflow pattern. The hooded design of the raised slots 204 also may contain the ashes in the fuel receptacle 200 so the bottom of the combustion chamber 100 and air intake holes 106 are always clean, for optimal airflow.

The raised slots 204 allow safe removability and portability of the fuel which, make it possible to sift the spent ashes out of the fuel receptacle while retaining the burning embers, when reloading the fuel receptacle 200 for extended continuous operation, or for more heat. The portability of the fuel receptacle 200 also allows for easy cleaning and/or discarding, into a safe container, unused burning fuel which can be put out and saved for later use. Cleaning the fuel receptacle 200 is practical and convenient by simply removing the fuel receptacle 200 containing the ashes from the combustion chamber 100, dumping its contents in a safe container, and cleaning the receptacle at any location desired.

The fuel receptacle 200 includes an insulated handle 210 to allow the fuel receptacle to be removed and conveniently handled by a user. The fuel receptacle 200 may be removed to sift and discard ashes at any time in the cooking process to maximize oxygenation and/or to reload fuel, and allows for easy cleaning at the end of the cooking cycle. The insulated handle 210 extends outside the combustion chamber 100 through a slot 110, in the extension ring 108 resting on the combustion chamber's rim 126. The handle insulation may be made of non-heat conducting material for safe removal of the fuel receptacle 200 even when the fuel receptacle 200 is loaded and hot.

Figure 4C:
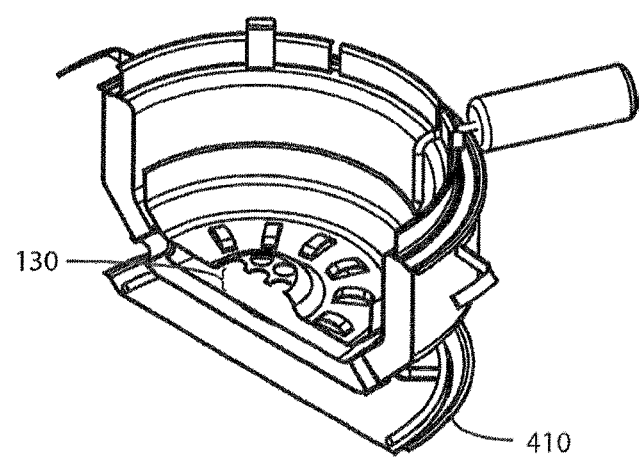
FIG. 4C is a perspective cutaway view of the fuel receptacle of FIG. 4A situated in the combustion chamber of FIG. 1A.
Figure 4D:
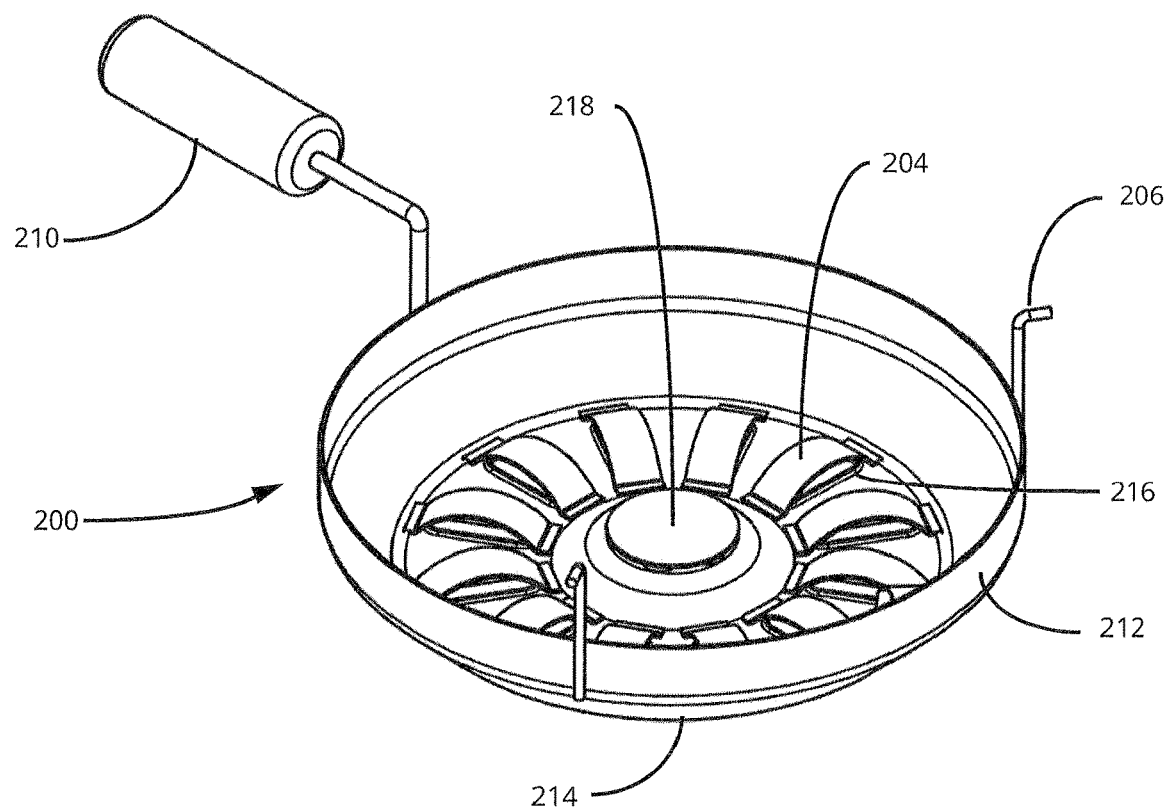
FIG. 4D is a perspective view of an alternative embodiment of the fuel receptacle.
Figure 4E:
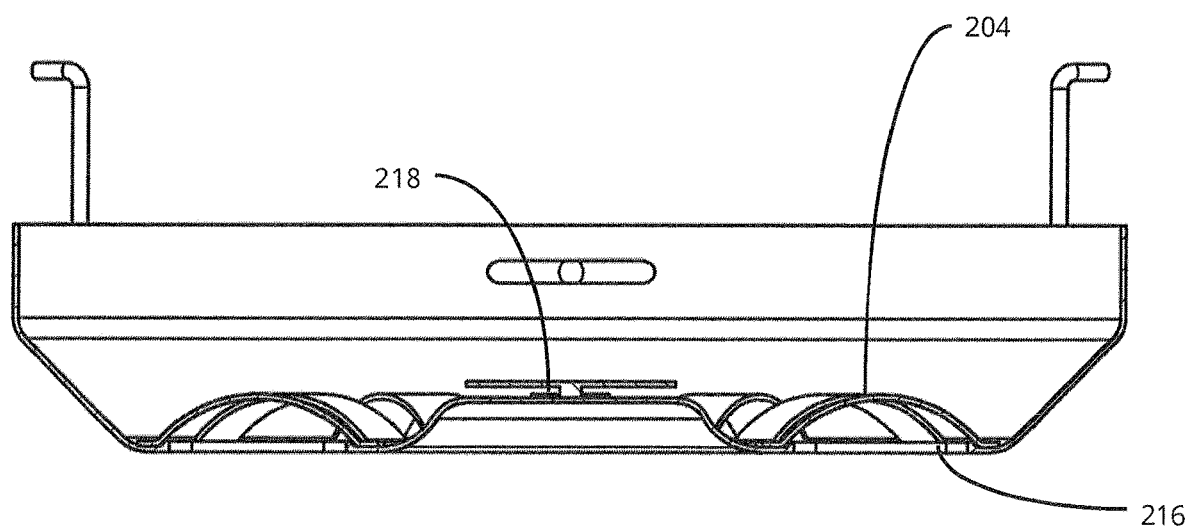
FIG. 4E is a front cutaway view of the fuel receptacle of FIG. 4D.
Figure 7A:
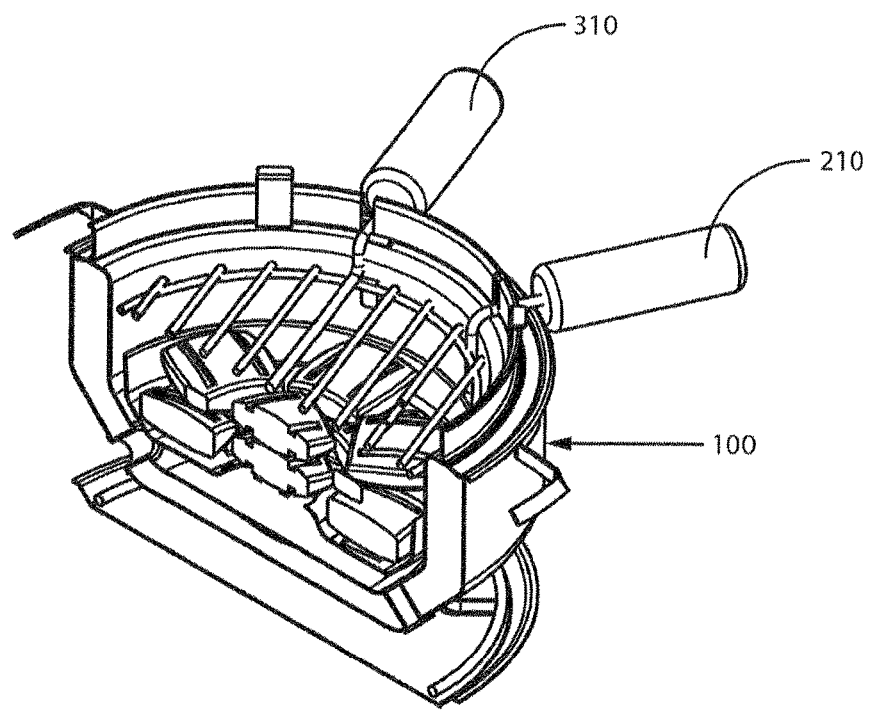
FIG. 7A is a perspective cutaway view of the embodiment of FIG. 1A including fuel in the fuel receptacle.
Figure 7B:
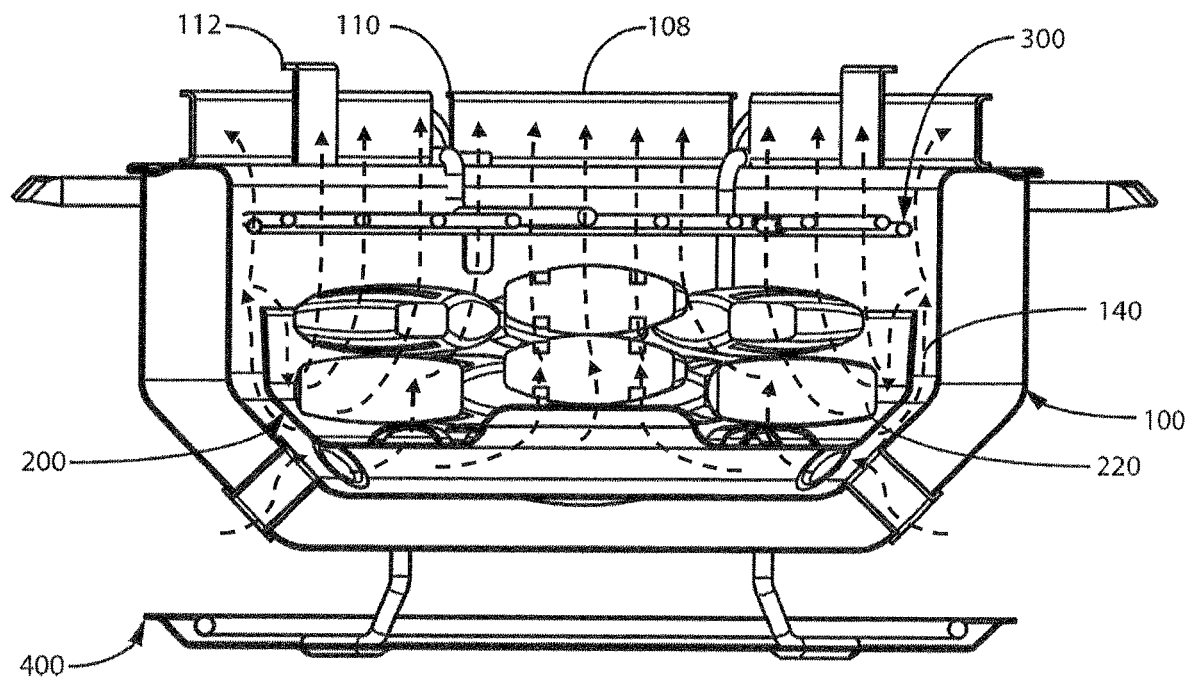
FIG. 7B is a side cutaway view of the embodiment of FIG. 1A including fuel in the fuel receptacle and showing air flow through the embodiment of the invention when the invention is in use.

Two arms 206 and the handle 210 allow the fuel receptacle 200 to safely and securely hang from the extension ring 108 of the combustion chamber 100. Referring especially to FIG. 4C, the height 130 at which the fuel receptacle 200 is suspended above the bottom of the combustion chamber 100 maximizes air intake through the holes 106, while minimizing radiant heat loss through the insulated wall 102 of the combustion chamber 100. Referring to FIG. 7B, the fuel receptacle is accommodated in the combustion chamber such that the outer perimeter of the fuel receptacle 200 is separated from the interior surface 120 of the insulated wall 102 by a gap 140 to provide an alternate source of air when ashes are collecting in the bottom of the fuel receptacle 200, thus providing ideally controlled air flow for combustion during all phases of the cooking or combustion process.

Figure 5A:
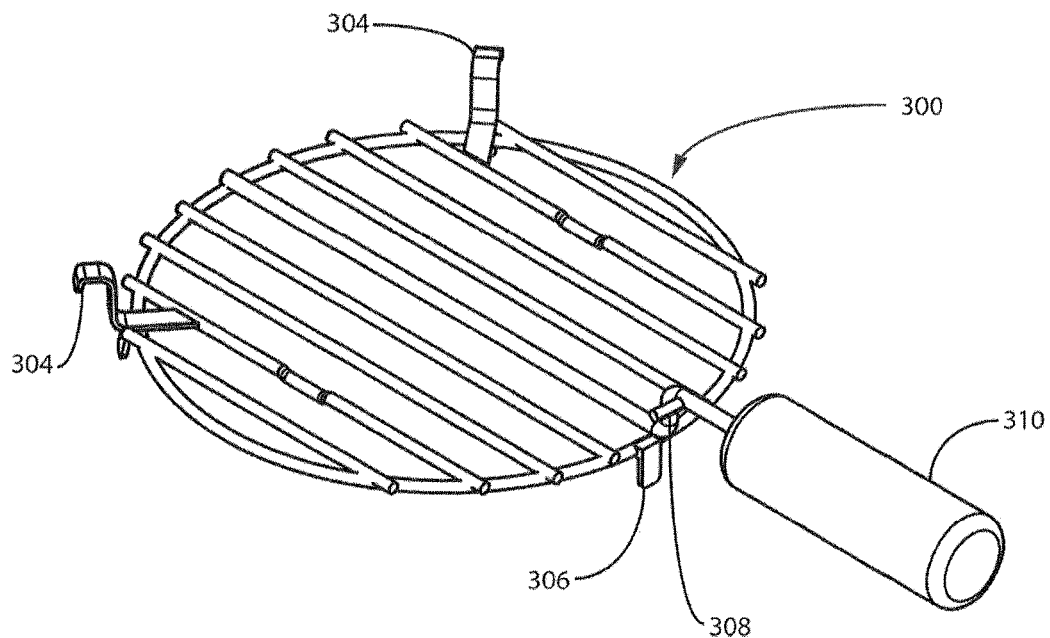
FIG. 5A is a perspective view of the grill depicted in FIG. 1A.
Figure 5B:
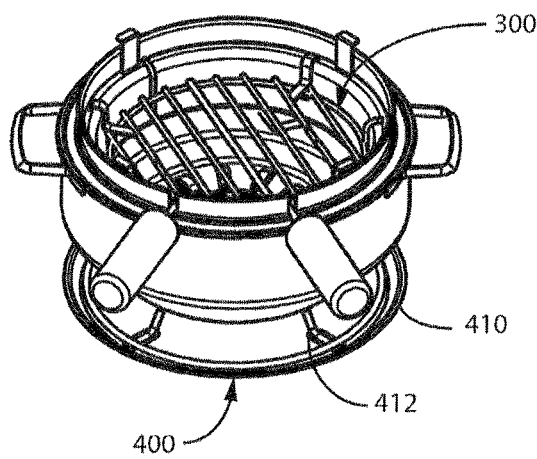
FIG. 5B is a perspective view of the grill of FIG. 5A situated in the combustion chamber of the embodiment of FIG. 1A in the lowered position.
Figure 5C:
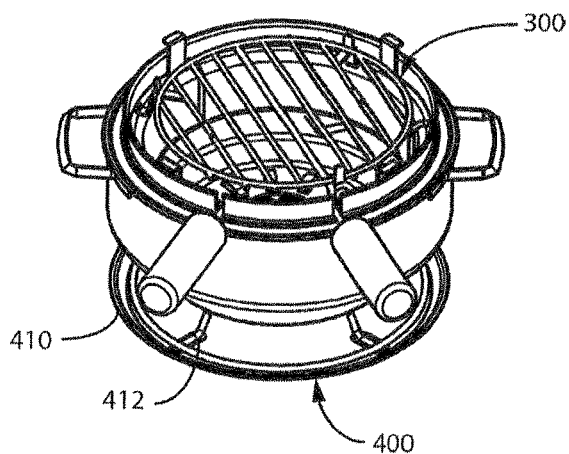
FIG. 5C is a perspective view of the grill of FIG. 5A situated in the combustion chamber of the embodiment of FIG. 1A in the raised position.
Figure 8A:
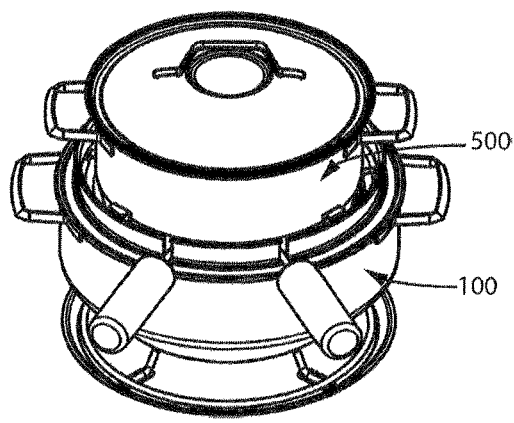
FIG. 8A is a perspective view of one embodiment of the invention including a pot configured to be used with the combustion chamber, fuel receptacle and grill.

A grill 300 has essentially the same diameter as the fuel receptacle 200. The grill 300 has a handle 310 and suspension arms 304 which protrude from the horizontal plane of the grill 300, allows the grill 300 it to be secured at two different heights above the fuel: either inside and just above the fuel receptacle, lower position, or, when flipped over into upper position, at the level of the top of the multifunction extension ring 108. The grill 300 is used either as a cooking surface, or to support cookware 500, 600, 700, 800 (See FIGS. 8A-D), depending upon the heat needs of the cookware and the food being cooked. The reversible grill 300 has two positions inside the combustion chamber 100: lower FIG. 5B and upper FIG. 5C. In its lower position, the reversible grill 300 is used to direct grill or support cookware (for example, 500, 600, 700, 800) nested deep in the combustion chamber 100, FIG. 8A for maximum heat transfer and cooking at high temperatures. In its upper position, the reversible grill 300 is used to direct grill or cook in cookware at lower temperatures. The position of the reversible grill can be easily changed by grasping the grill 300 by its insulated handle 310 and turning it.

The two arms 304 and handle 310 may be integral parts of the reversible grill, and are used to hang the grill from the rim 126 of the combustion chamber 100, when in lower position. The grill 300 can be easily turned by grasping it by its insulated handle 310, which extends outside the body of the device through a slot 110 in the extension ring 108 of the combustion chamber 100. The insulated handle 310 is located so that it is safe and convenient for the user to manipulate in conjunction with and simultaneously with the handled fuel receptacle 200. The arms 304, in conjunction with the handle 310, suspend the grill 300 in a lower and an upper fixed elevated position above the fuel, which can be user selected simply by flipping the grill over. The grill has safety tabs 306 extending from the arms 304 and handle 310 on its round outer edge, which face upward when the grill is in the upper position. The safety tabs 306 serve to retain and inhibit slippage of properly sized cookware 500 (or smaller) when the grill is in the upper position. (When the grill is in the lower position, this function is performed by the arms 304 themselves and the retaining ring 108. The safety tabs 306 are also used when the grill is in the upper position to provide support for griddles, or other cookware that are larger than the diameter of the grill 300.

A safety pin 308 is welded to the handle bar, 310; this safety pin 308 adds additional positional security to the reversible grill during use.

Efficiency Features.

Various elements of the design function individually and together to produce an advanced degree of fuel efficiency. The insulated wall 102 minimizes loss of heat through the bottom and sides of the combustion chamber 100, thereby producing more heat at the grill 300 or cookware 800, 810, 820 level above; the innovative air circulation patterns keep fuel burning hotter and longer; the extension ring 108 which allows the device to deliver and/or retain maximum heat directly to the cooking surfaces; the ability that the removable fuel receptacle 200 provides for the user to easily discharge partially used fuel into a safe container (not shown) to be extinguished and used at a later time; the unique "reversible" dual-position grill 300; the multifunction extension ring 108 which optimally channels heated air flow to cookware 800, 810, 820 or grill 300 and also shields against the cooling effect of side drafts; various vented and unvented covering accessories which retain heat.

Figure 6A:
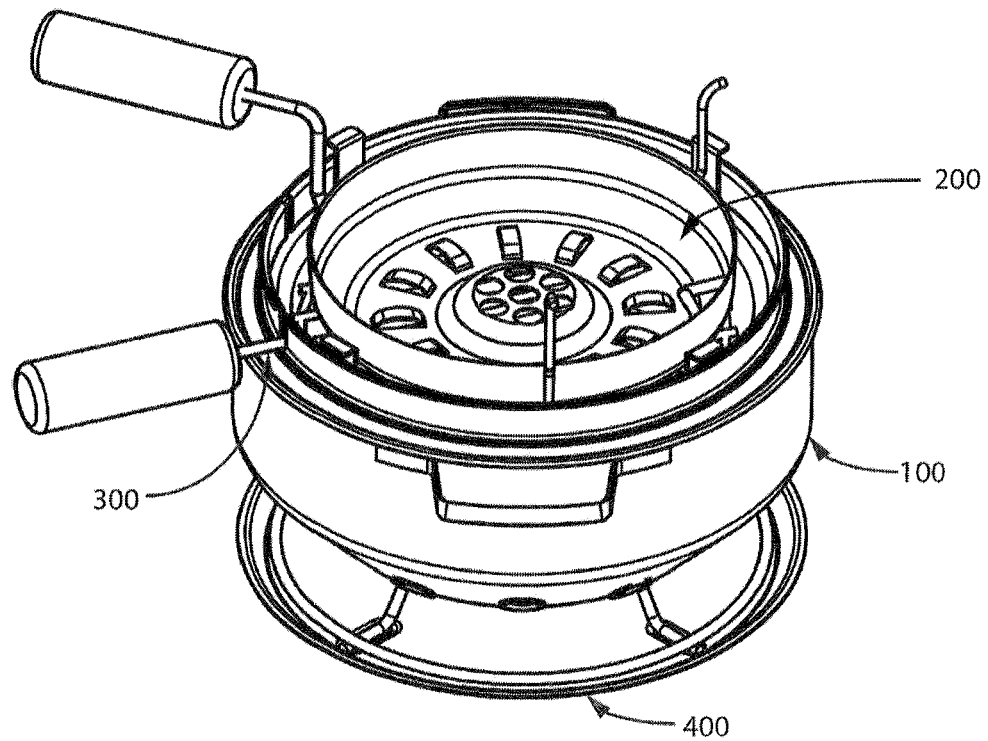
FIG. 6A is a perspective view of an alternate configuration of the combustion chamber, fuel receptacle, and grill of the embodiment of FIG. 1A.
Figure 6B:
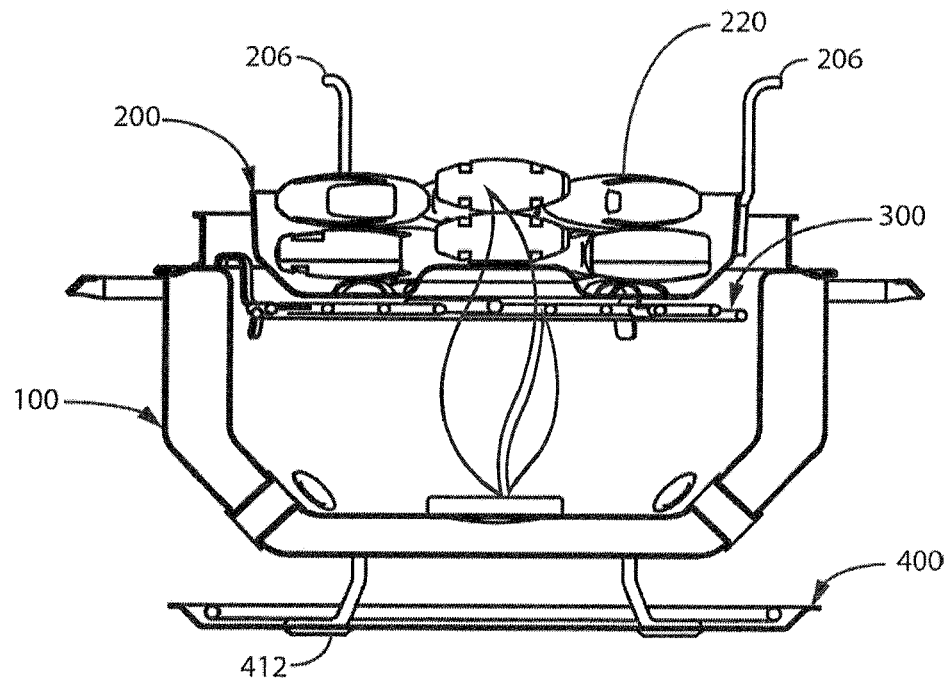
FIG. 6B is a perspective view of the configuration of FIG. 6A including fuel shown in the fuel receptacle.

Referring to FIG. 6, there are many ways to ignite the fuel 220 in this heat producing device. One practical, easy and fast method is by placing cotton balls or a paper napkin soaked in 91 percent alcohol or vegetable oil (alcohol is cleaner) on the bottom of the combustion chamber 100. Light the alcohol-soaked cotton balls or napkin, place the grill 300 on its lower position inside the combustion chamber 100, and place the fuel loaded receptacle 200 over the grill 300. Note that the fuel receptacle 200 and the grill 300 positions are switched during this fuel lighting procedure. Once the alcohol is fully burned, the carbon based fuel (charcoal) should have had started to burn, the positions of the fuel receptacle 200 and reversible grill 300 are then returned to their normal working position. The heat from the ignited fuel will create a chimney effect in the uncovered combustion chamber 100, and the fuel 220 is ready to cook on within a short period of time thereafter.

Due to the mobility of the fuel receptacle 200, the fuel 220 can also be ignited by placing the fuel receptacle 200 directly over an outdoor gas burner or the like or can be loaded with pre-ignited fuel (charcoal ignited elsewhere).

Accessories

In some embodiments, a round plate 400 with an upward raised edge 410 and depressions 412 to receive the legs 114 of the combustion chamber. This plate 400 is designed to catch any spillage that may drip from the combustion chamber, protecting the table, tablecloth or the surface where it rests. The plate 400 also provides an even surface where the device can rest even if the surface below is not perfectly flat and shields the table from any radiant heat emanating from the lower part of the combustion chamber 100.

A specially sized and shape pot 500 has been designed to be used with this device. The pot 500 rests on the grill 300 and inside the combustion chamber 100, when in low position FIG. 5B, delivering the most efficiency since the bottom of its side walls are shielded from cold air drafts and heat is forced to circulate between the wall 120 and the raised side 212 of the combustion chamber 200 and the pot 500. When the grill 300 is turned over to its high position, away from the heat source 220 to diminish the temperature reaching the cookware, the pot 500 is held safely in place by a set tabs 306 welded to the grill 300, these tabs reduce the possibility of the pot falling sliding or falling off the device.

Even though accessory cookware has been designed to be used optimally with this device, the device works extremely well with any and all kinds of pots, pans, woks, griddles, skillets and other cookware made from many different materials such as clay, stainless and other steel, cast and other iron, aluminum, copper, mixed alloy and combinations of alloys.

Figure 8B:
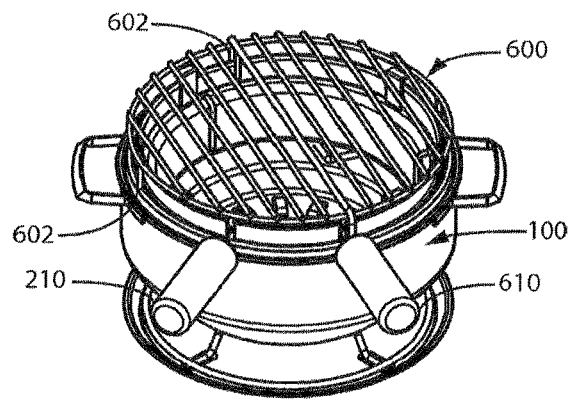
FIG. 8B is a perspective view of one embodiment of the invention situating the grill resting on the tabs of the extension ring of the combustion chamber.

A larger long handled Grill 600, FIG. 8B has been designed to be used when grilling foods and more space is needed. This grill has an insulated handle 610 and legs 602 which keep it securely and at the ideal height from the fuel 220 to allow more grilling space while assuring good air circulation inside the combustion chamber 100.

Figure 8C:
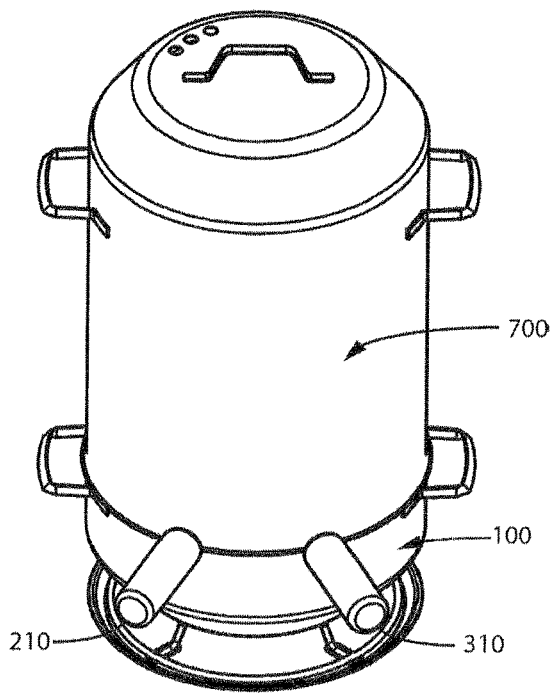
FIG. 8C is a perspective view of one embodiment of the invention including a tall smoking lid to be used with the combustion chamber, fuel receptacle and grill.
Figure 8D:
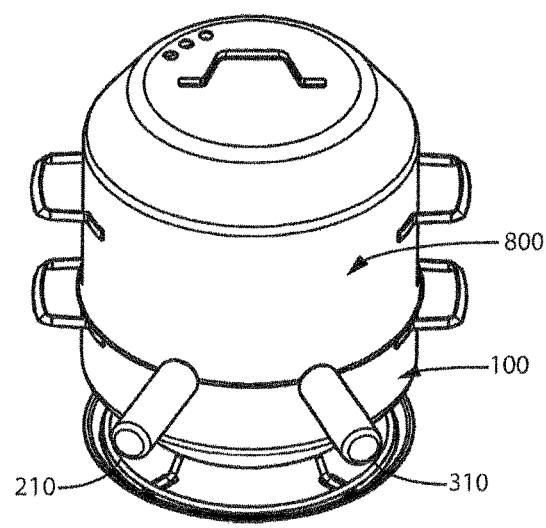
FIG. 8D is a perspective view of one embodiment of the invention including a medium height lid configured to be used with the combustion chamber, fuel receptacle and grill.
Figure 8E:
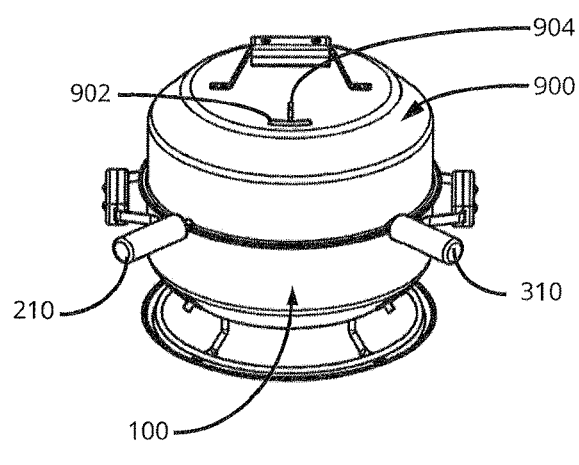
FIG. 8E is a perspective view of an alternative embodiment of the invention having a cover having an opening that may be alternately open or occluded.
Figure 8F:
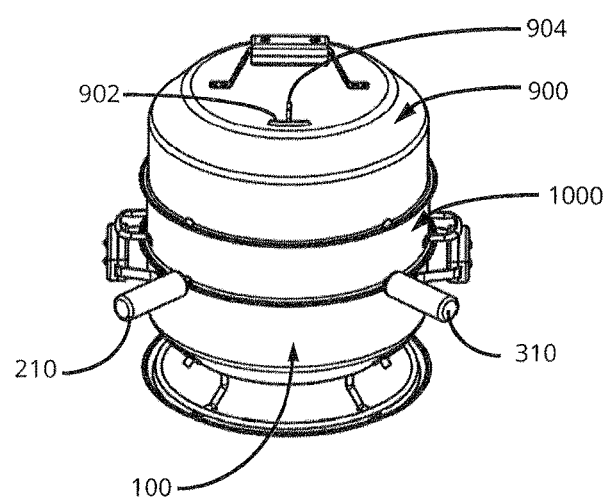
FIG. 8F is a perspective view of the embodiment of FIG. 8E having an optional height extension.

Referring to FIG. 8C, a tall smoking lid 700 to smoke food has been designed to work with the heat producing device. Referring to FIG. 8D, a medium height lid 800 that can be used for broiling and light baking, and also for additional heat retention during grilling or boiling or broiling in windy conditions. As shown in FIGS. 8E and F, the lid 900 may include a vent 902 that may be selectively opened or closed to control air flow. In the embodiment shown FIGS. 8E and F, the vent 902 includes a vent tab 904 that can be in a vertical or a horizontal position. When the vent tab 904 is in the horizontal position, the vent tab 904 substantially covers the vent 902 preventing air flow through the lid 900. When the vent tab 904 is in the vertical position, the vent 902 is substantially unblocked, allowing air to flow through the vent 902 in the lid 900. The vent tab 904 may be rotated between the vertical and horizontal positions.

Figure 8G:
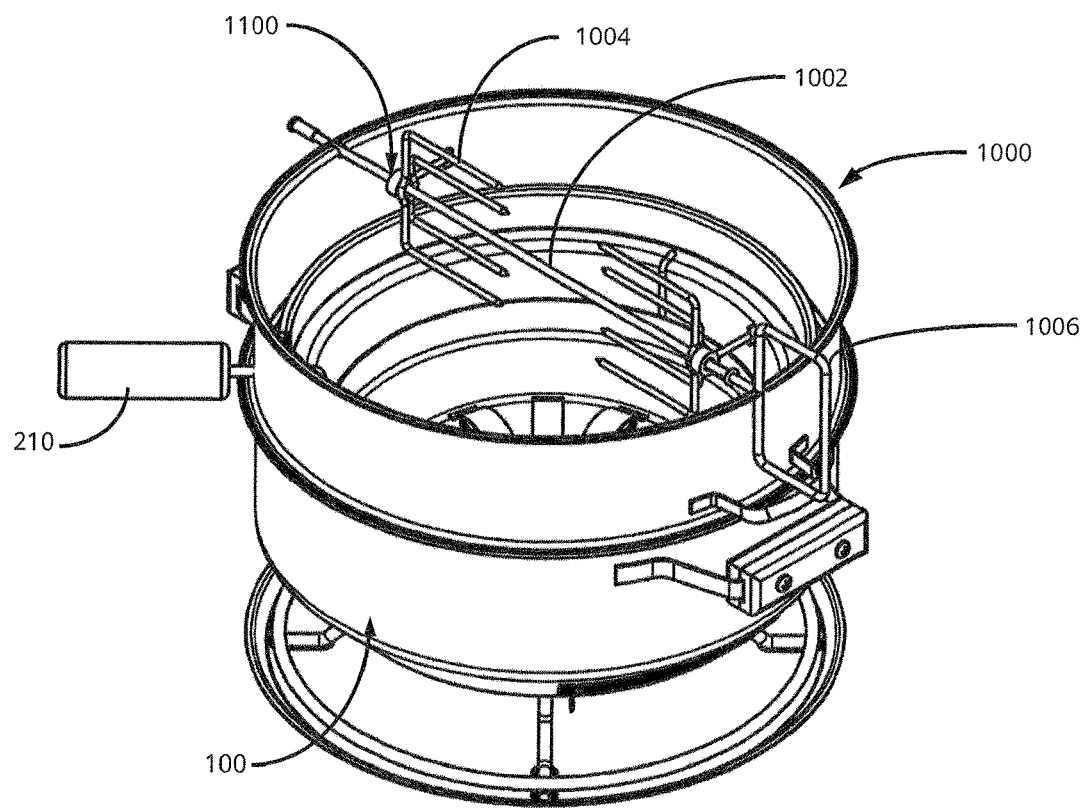
FIG. 8G is a perspective view of an alternative embodiment of the invention having a skewer to roast meats.
Figure 9A:
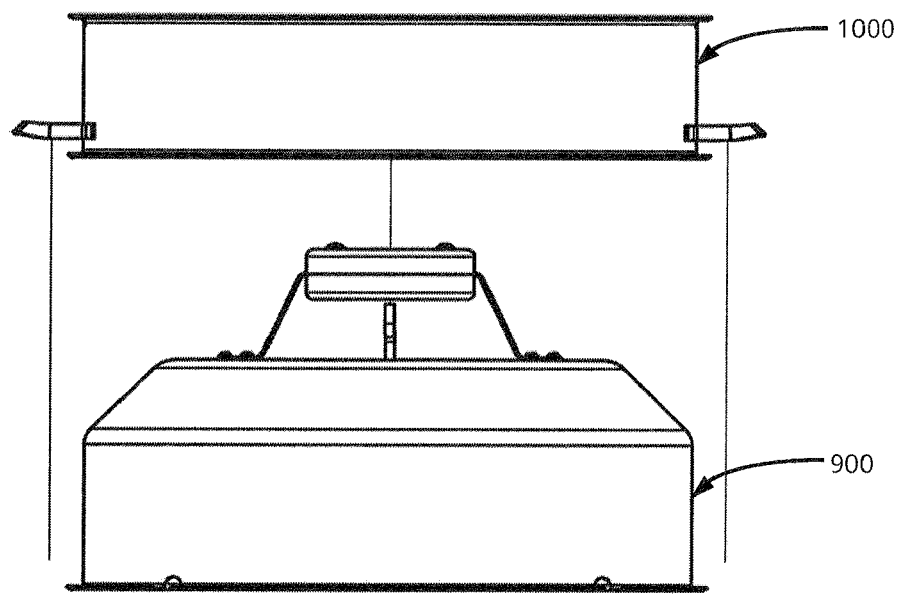
FIG. 9A is an exploded side view of the height extension of FIG. 8F.
Figure 9B:
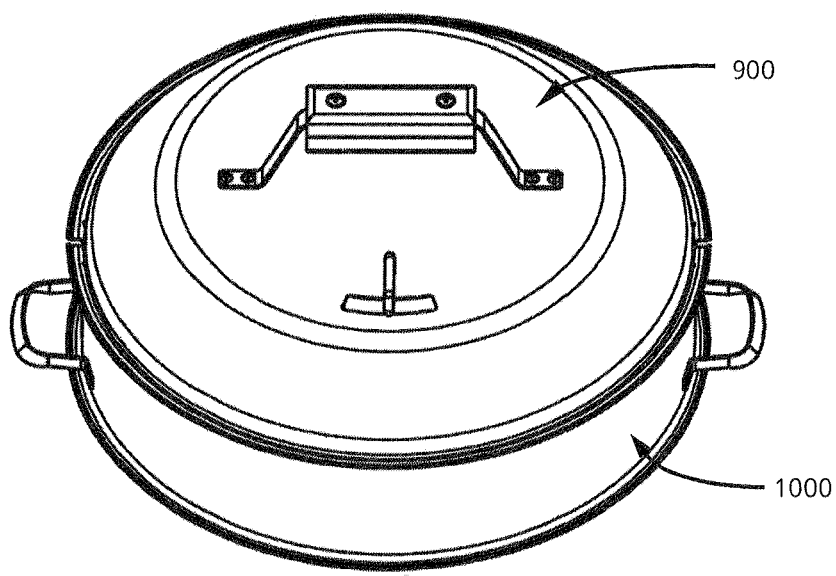
FIG. 9B is a perspective view of the lid and height extension of FIG. 8F collapsed for storage.
Figure 9C:
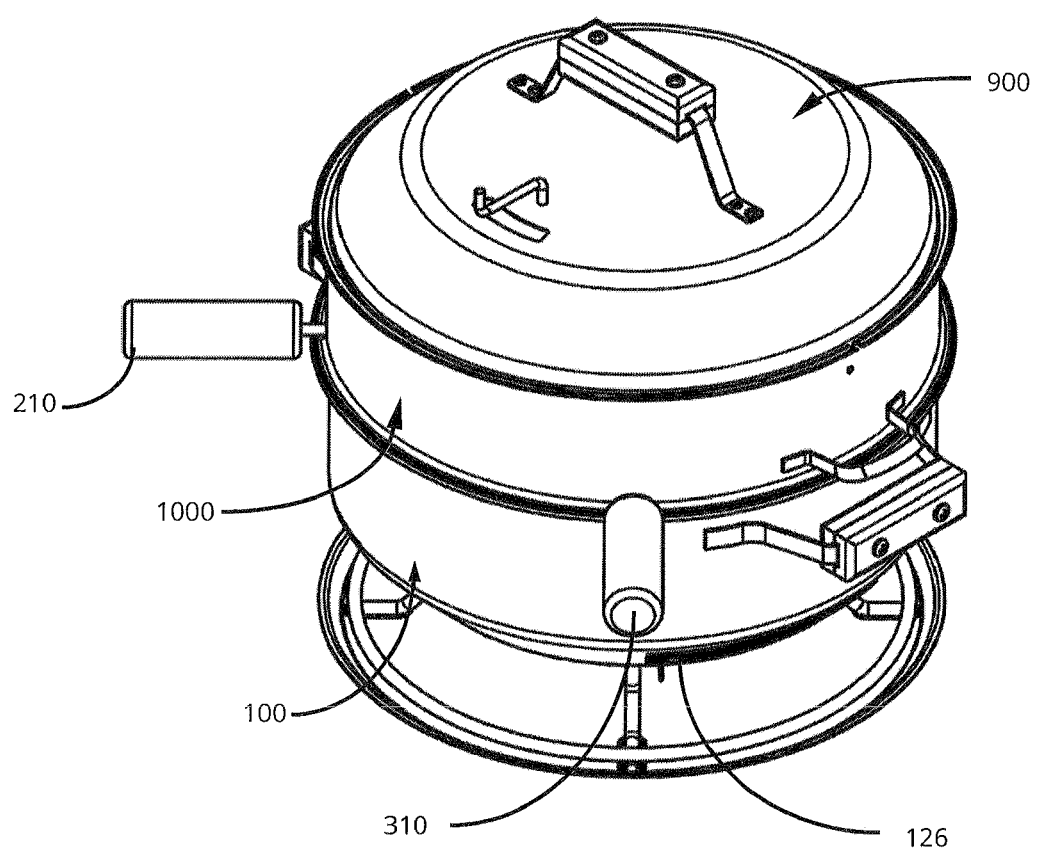
FIG. 9C is a perspective view of the embodiment of FIG. 8 collapsed for storage.

As shown in FIGS. 9A-C, the invention may include a height extension 1000. As particularly shown in FIGS. 9B and C, the height extension 100 may be configured to fit around the outside circumference of the lid 900 so that the height extension 1000 may be collapsed around the lid 900 for storage or to provide further insulation to the lid 900 during use. The height extension 1000 may also be configured to work with other accessories. As particularly shown in FIG. 8G, the height extension 1000 may accommodate a skewer 1100. Skewer 1100 includes an axis 1102, and two prongs 1104. At least one of the prongs 1104 may be removed and meat skewered onto the axis 1102 and stabilized by the other prong 1104. The removed prong 1104 may then be replaced on the axis 1102 to secure the meat on the skewer 1100. The meat may be rotated by rotating the axis 1102 using a skewer handle 1106.

We claim:
1. A heating apparatus, comprising,
an insulated combustion chamber having an inner enclosure wall defining an opening at an open end of the combustion chamber, an extension ring extending from the open end of the insulated combustion chamber, and at least one hole situated substantially distal to the opening, the opening having a shape;

a fuel receptacle having a perimeter configured to fit inside the shape of the opening, wherein the fuel receptacle further comprises a raised center section and a peripheral section, wherein the raised center section comprises at least one heat channel and wherein the peripheral section comprises at least one hooded slot; and a grill having essentially the same perimeter shape as the fuel receptacle,
wherein at least one of the grill and the fuel receptacle has a handle,
wherein the extension ring comprises at least one slot to accommodate the handle,
wherein the grill further comprises at least one suspension arm protruding from the plane of the grill, and
wherein the suspension arm is shaped to rest at least partially upon the inner enclosure wall of the combustion chamber when the handle is situated in the slot of the extension ring.

2. The heating apparatus of claim 1, wherein the extension ring comprises at least one tab extending from the extension ring.

3. The heating apparatus of claim 2, wherein the tabs are configured to provide an air exhaust space when a piece of cookware is used with the heating apparatus.

4. The heating apparatus of any one of claim 3, wherein the grill has at least one suspension arm protruding from the plane of the grill.

5. The fuel receptacle of claim 4, wherein the outside structure is the cooking apparatus.

6. The fuel receptacle of claim 5, further comprising at least one arm to hang the fuel receptacle on an outside structure.

7. The heating apparatus of claim 3, wherein the fuel receptacle is removably situated in the combustion chamber, and wherein the fuel receptacle has a lateral wall, wherein the lateral wall is separated from the inner enclosure wall by a space when the fuel receptacle is situated within the combustion chamber.

8. The heating apparatus of claim 1, wherein the inner enclosure wall has a contour, and wherein the combustion chamber has an outer enclosure wall that follows the contour of the inner enclosure wall and separated from the inner enclosure wall by an insulation space, and wherein the insulation space is filled with an insulating material.

9. The heating apparatus of claim 1, wherein the fuel receptacle is removably situated in the combustion chamber, and wherein the fuel receptacle has a lateral wall, wherein the lateral wall is separated from the inner enclosure wall by a space when the fuel receptacle is situated within the combustion chamber.

10. The heating apparatus of claim 1, wherein the grill has at least one suspension arm protruding from the plane of the grill.

11. The heating apparatus of claim 1, wherein the grill includes a safety tab.

12. A method of cleaning a heating apparatus, the method comprising providing
an insulated combustion chamber having an inner enclosure wall defining an opening at an open end of the combustion chamber and at least one hole situated substantially distal to the opening, the opening having a shape, wherein the combustion chamber has an extension ring extending from the open end of the combustion chamber, the extension ring having a slot,
a fuel receptacle having a perimeter configured to fit inside the shape of the opening, wherein the fuel receptacle further comprises a handle, a raised center section and a peripheral section, wherein the raised center section comprises at least one heat channel and wherein the peripheral section comprises at least one hooded slot, wherein the handle of the fuel receptacle fits within the slot of the extension ring;
a grill having essentially the same perimeter as the fuel receptacle,
wherein the grill further comprises at least one suspension arm protruding from the plane of the grill, wherein the suspension arm is shaped to rest at least partially upon the inner enclosure wall of the combustion chamber when the handle is situated in the slot of the extension ring;
removing the fuel receptacle from the combustion chamber;
cleaning the fuel receptacle; and
replacing the fuel receptacle within the combustion chamber.

13. A method of lighting a combustible fuel in connection with a heating apparatus, the method comprising providing
an insulated combustion chamber having an inner enclosure wall defining an opening at an open end of the combustion chamber and at least one hole situated substantially distal to the opening, the opening having a shape, wherein the combustion chamber has an extension ring extending from the open end of the combustion chamber, the extension ring having a slot,
a fuel receptacle having a perimeter configured to fit inside the shape of the opening, wherein the fuel receptacle further comprises a handle, a raised center section and a peripheral section, wherein the raised center section comprises at least one heat channel and wherein the peripheral section comprises at least one hooded slot, wherein the handle of the fuel receptacle fits within the slot of the extension ring;
a grill having essentially the same perimeter as the fuel receptacle,
wherein the grill further comprises at least one suspension arm protruding from the plane of the grill, wherein the suspension arm is shaped to rest at least partially upon the inner enclosure wall of the combustion chamber when the handle is situated in the slot of the extension ring;
placing a lighting fuel in the combustion chamber;
loading the fuel receptacle with a combustible fuel;
resting the handle of the fuel receptacle in the slot of the extension ring such that the fuel receptacle rests above the lighting fuel;
lighting the lighting fuel.

14. The method of claim 13, wherein the lighting fuel is isopropyl alcohol.

* * * * *